United States Patent
Hsu et al.

(10) Patent No.: US 7,448,647 B2
(45) Date of Patent: Nov. 11, 2008

(54) APPARATUS FOR REDUCING THE MAGNITUDE OF A PRESSURE WAVE DURING DEPLOYMENT OF AN INFLATABLE VEHICLE OCCUPANT PROTECTION DEVICE

(75) Inventors: Kwen Hsu, Rochester Hills, MI (US); Songwei Zhang, Troy, MI (US); Ivanna Malinow, Macomb, MI (US); Charles E. Steffens, Jr., Washington, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 375 days.

(21) Appl. No.: 11/355,606

(22) Filed: Feb. 16, 2006

(65) Prior Publication Data

US 2007/0187937 A1 Aug. 16, 2007

(51) Int. Cl.
*B60R 21/26* (2006.01)
(52) U.S. Cl. ..................... 280/740; 280/730.2
(58) Field of Classification Search ............ 280/736, 280/740, 730.2, 749, 742
See application file for complete search history.

(56) References Cited

U.S. PATENT DOCUMENTS

| 5,172,933 | A | * | 12/1992 | Strasser | ............ 280/740 |
|---|---|---|---|---|---|
| 5,588,672 | A | | 12/1996 | Karlow et al. | |
| 5,788,270 | A | | 8/1998 | Haland et al. | |
| 6,164,688 | A | | 12/2000 | Einsiedel et al. | |
| 6,293,581 | B1 | | 9/2001 | Saita et al. | |
| 6,846,013 | B2 | * | 1/2005 | Smith | ............ 280/740 |
| 7,357,411 | B2 | * | 4/2008 | Kurimoto et al. | ............ 280/729 |
| 2002/0070537 | A1 | * | 6/2002 | Webber et al. | ............ 280/730.2 |
| 2006/0061075 | A1 | * | 3/2006 | Aoki et al. | ............ 280/730.2 |

* cited by examiner

*Primary Examiner*—Eric Culbreth
*Assistant Examiner*—Nicole Verley
(74) *Attorney, Agent, or Firm*—Tarolli, Sundheim, Covell & Tummino LLP

(57) ABSTRACT

An apparatus (10) provides inflation fluid to an inflatable vehicle occupant protection device (14). The apparatus (10) includes an inflator (24) actuatable to provide inflation fluid for inflating the protection device (14). A conduit (22) directs inflation fluid into the protection device (14) from the inflator (24). A deflector (50) is arranged in fluid communication with the conduit (22) and has at least a portion in fluid communication with the protection device (14). The deflector (50) is configured to direct inflation fluid into the protection device (14) in opposing directions to reduce the magnitude of pressure waves experienced by a vehicle occupant (28).

16 Claims, 5 Drawing Sheets

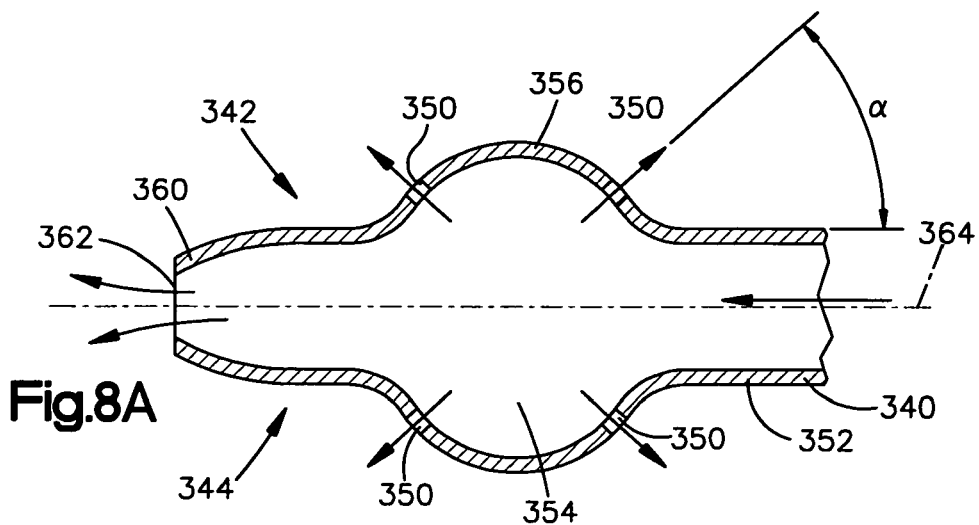
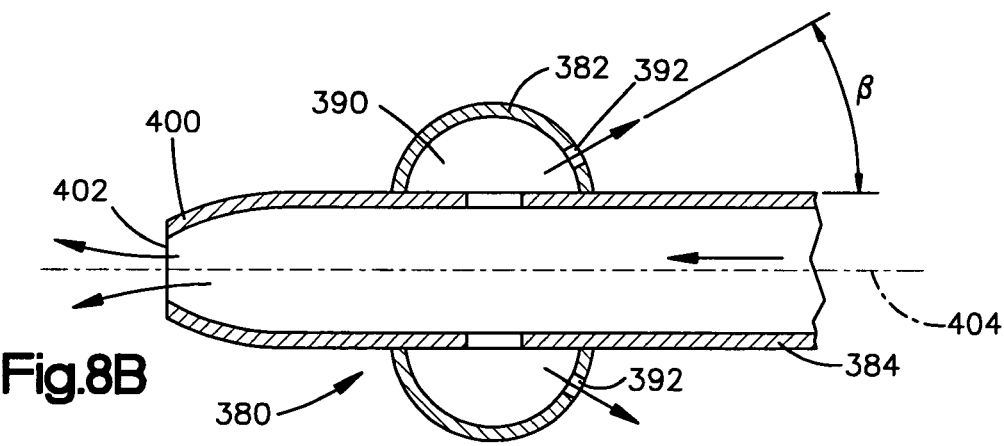
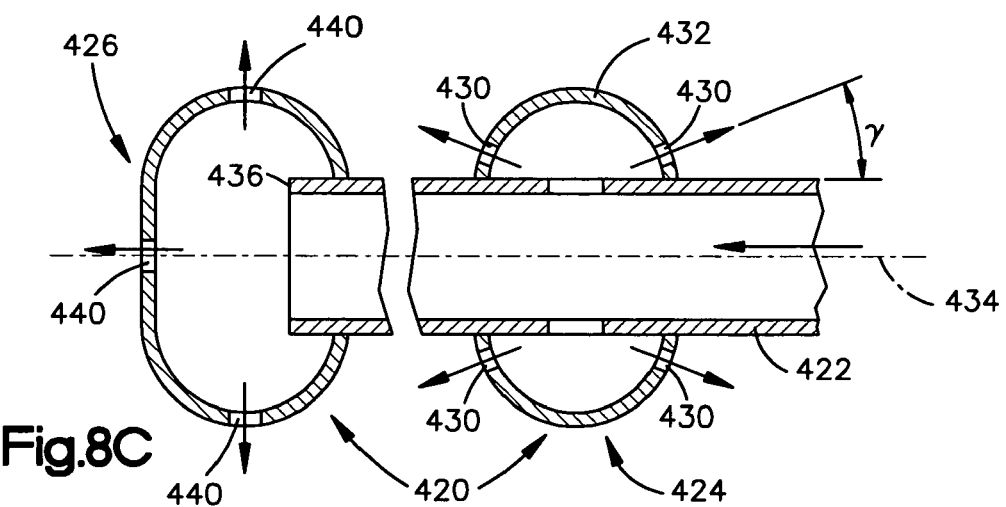

APPARATUS FOR REDUCING THE MAGNITUDE OF A PRESSURE WAVE DURING DEPLOYMENT OF AN INFLATABLE VEHICLE OCCUPANT PROTECTION DEVICE

TECHNICAL FIELD

The present invention relates to an inflatable vehicle occupant protection device for helping to protect an occupant of a vehicle.

BACKGROUND OF THE INVENTION

It is known to inflate an inflatable vehicle occupant protection device to help protect a vehicle occupant in the event of a vehicle collision. Examples of inflatable vehicle occupant protection devices include frontal air bags, side air bags, inflatable curtains, inflatable seat belts, inflatable knee bolsters, and inflatable head liners.

Inflatable curtains are inflatable away from a vehicle roof to a deployed position between a side structure of the vehicle and a vehicle occupant. Inflatable curtains are inflatable with inflation fluid provided by an inflator and delivered to the curtain by a conduit, such as a fill tube.

SUMMARY OF THE INVENTION

The present invention relates to an apparatus for providing inflation fluid to an inflatable vehicle occupant protection device. The apparatus includes an inflator actuatable to provide inflation fluid for inflating the protection device. A conduit directs inflation fluid into the protection device from the inflator. A deflector is arranged in fluid communication with the conduit and has at least a portion in fluid communication with the protection device. The deflector is configured to direct inflation fluid into the protection device in opposing directions to reduce the magnitude of pressure waves experienced by the occupant.

The present invention also relates to an apparatus for helping to protect an occupant of a vehicle. The apparatus comprises an inflatable curtain inflatable between the side structure and a vehicle occupant. An inflator provides inflation fluid for inflating the inflatable curtain. A fill tube delivers inflation fluid from the inflator to the inflatable curtain. The fill tube has a longitudinal axis. A deflector is secured to the fill tube. The deflector comprises apertures for directing inflation fluid from the fill tube into the inflatable curtain in opposing directions substantially along the longitudinal axis.

BRIEF DESCRIPTION OF THE DRAWINGS

The foregoing and other features of the present invention will become apparent to those skilled in the art to which the present invention relates upon reading the following description with reference to the accompanying drawings, in which:

FIGS. 8A-8C illustrate alternative configurations of certain portions of the apparatuses of FIGS. 1-7.

DESCRIPTION OF EMBODIMENTS

Figure 1:
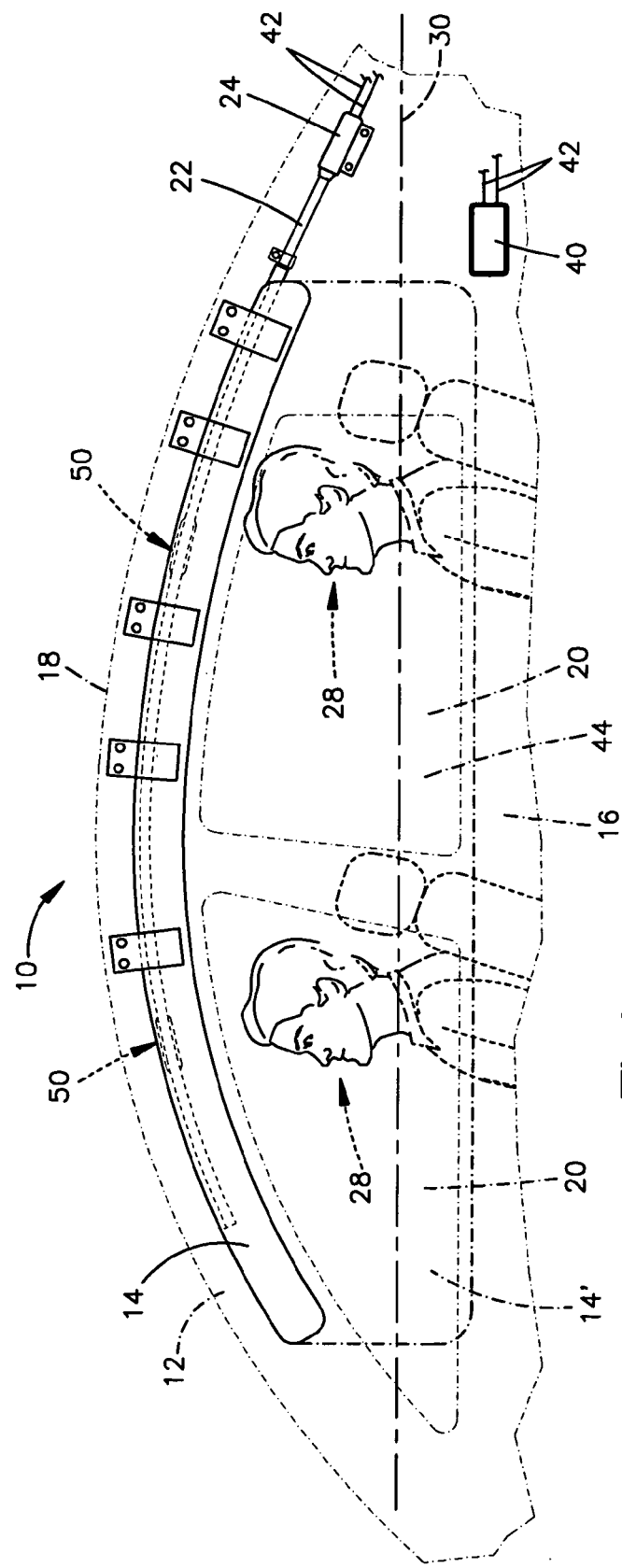
FIG. 1 illustrates an apparatus for helping to protect an occupant of a vehicle, according to a first embodiment of the present invention.

Representative of the present invention, an apparatus 10 helps to protect occupants 28 of a vehicle 12. According to a first embodiment of the invention illustrated in FIG. 1, the apparatus 10 includes an inflatable vehicle occupant protection device in the form of an inflatable curtain 14. The vehicle 12 may also include additional inflatable vehicle occupant protection devices (not shown), such as inflatable air bags, inflatable seat belts, inflatable knee bolsters, inflatable headliners, or knee bolsters operated by inflatable air bags.

The inflatable curtain 14 has a stored position adjacent the intersection of a side structure 16 and a roof 18 of the vehicle 12. The inflatable curtain 14 is inflatable from the stored position in a direction away from the roof 18 to a deployed position (shown in dashed lines at 14') along the side structure 16. In the deployed position, the inflatable curtain 14 is positioned between the side structure 16 and any occupants 28 of the vehicle 12.

The inflatable curtain 14 can be constructed of any suitable material, such as nylon (e.g., woven nylon 6-6 yarns). The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may have any known construction and, in the embodiment illustrated in FIG. 1, the inflator 24 is connected in fluid communication with the inflatable curtain 14 through a conduit 22, such as a fill tube.

The inflator 24 may have any known construction that is suitable for inflating the inflatable curtain 14. For example, the inflator 24 may contain a stored quantity of pressurized inflation fluid (not shown) in the form of a gas for inflating the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

Referring to FIG. 1, upon sensing the occurrence of an event for which inflation of the inflatable curtain 14 is desired, such as a side impact, a vehicle rollover, or both, a control module 40 provides an actuation signal to the inflator 24 via lead wires 42. Upon actuation of the inflator 24, inflation fluid is directed through the fill tube 22 into the inflatable curtain 14. The inflatable curtain 14 inflates and deploys under the pressure of inflation fluid provided by the inflator 24 from the stored position illustrated at 14 to the deployed position illustrated at 14'.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and generally parallel to a longitudinal axis 30 of the vehicle. The inflatable curtain 14 helps absorb occupant impacts with the curtain and helps distribute the energy of impacts throughout a large area of the curtain.

Figure 2:
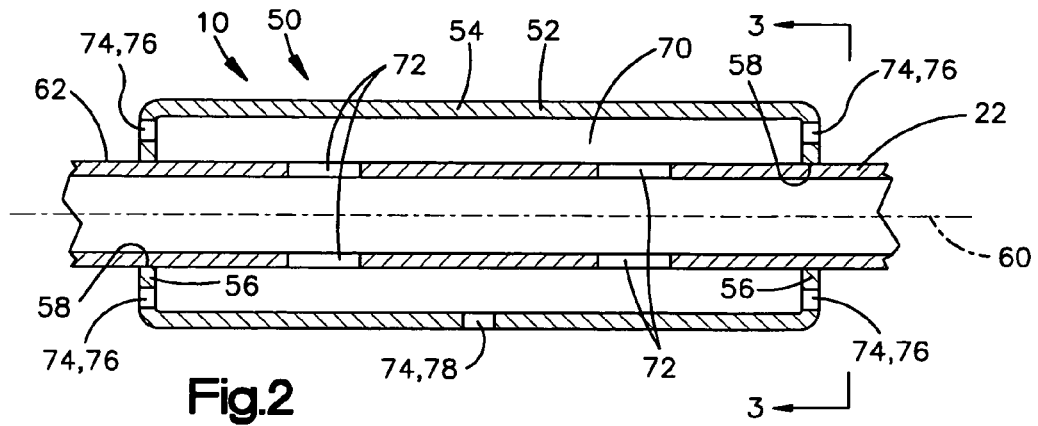
FIG. 2 is a sectional view of a portion of the apparatus of FIG. 1.
Figure 3:
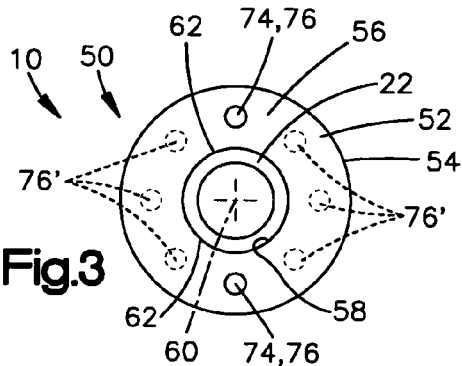
FIG. 3 is a sectional view taken generally along line 3-3 in FIG. 2.

According to the present invention, the apparatus 10 includes one or more deflector means or deflectors 50 for helping to suppress or reduce the pressure wave associated with deployment of the inflatable curtain 14. An example of a deflector 50 is illustrated in FIGS. 2 and 3. The deflector 50 of FIGS. 2 and 3 is representative of a configuration for one or both of the deflectors shown in FIG. 1. In FIGS. 2 and 3, each deflector 50 includes a shroud 52 that is secured to the fill tube 22 and encloses a portion of the fill tube. The shroud 52 may be constructed of any material suited to perform in accordance with the description provided herein and may be connected to the fill tube 22 in any suitable manner. For example, the shroud 52 may be constructed of steel and welded to the fill tube 22.

The shroud 52 has a generally cylindrical configuration with a side wall 54 generally centered on and extending generally parallel to an axis 60 of the fill tube 22. The shroud 52 also includes opposite end walls 56 with respective central openings 58 that have diameters equal to or about equal to an outside diameter of the fill tube 22 to facilitate a connection with the fill tube. The end walls 56 may be formed, for example, by welding the end walls to the side wall 54 or by swaging the side wall 54 of the shroud 52. Alternatively, the deflector 50 may be constructed from two cup-shaped pieces joined together at their rims.

The shroud 52 is fitted over an outer surface 62 of the fill tube 22 and slid or otherwise moved to a desired axial position along the tube. The shroud 52 is secured to the fill tube 22 at the desired axial position by means, such as welds, that interconnect the end walls 56 to the fill tube at the interface between the surfaces of the fill tube that define the openings 58 and the outer surface 62 of the tube.

The shroud 52 helps define an annular chamber 70 between the shroud and the fill tube 22. The fill tube 22 includes apertures 72 that provide fluid communication between the tube and the chamber 70. In the configuration of FIG. 2, there are two sets of radially opposed apertures 72. The fill tube 22 could, however, include any desired number of apertures 72 arranged in any desired configuration in the fill tube 22.

The shroud 52 also includes apertures 74 that provide fluid communication between the chamber 70 and the exterior of the deflector 50. The apertures 74 include end wall apertures 76 in the end walls 56 of the shroud 52 and side wall apertures 78 in the side wall 54 of the shroud. In the configuration of FIGS. 2 and 3, each end wall 56 includes two end wall apertures 76 positioned radially opposite each other. It will be appreciated, however, that the end walls 56 may include any desired number of end wall apertures 76, such as those shown in dashed lines at 76' in FIG. 3. It will also be appreciated that the side wall 54 may include any desired number of side wall apertures 78. The number of apertures 74 included in the deflector 50 may, for example, depend on the inflatable volume of the inflatable curtain 14, which may dictate the required volumetric flow rate of inflation fluid through the deflector.

In the assembled condition of the apparatus 10, the apertures 74 of the deflectors 50 are positioned in fluid communication with an inflatable volume 44 (see FIG. 1) of the inflatable curtain 14. In the configuration of FIG. 1, this is achieved by positioning the deflector 50 inside the inflatable curtain 14. The inflator 24, when actuated, discharges inflation fluid into the fill tube 22. The fill tube 22 directs the inflation fluid in radial directions, generally perpendicular to the axis 30, through the apertures 72 into the chamber 70. The deflector 50 directs the inflation fluid through the apertures 74 into the inflatable volume 44 to inflate the curtain 14.

Figure 4B:
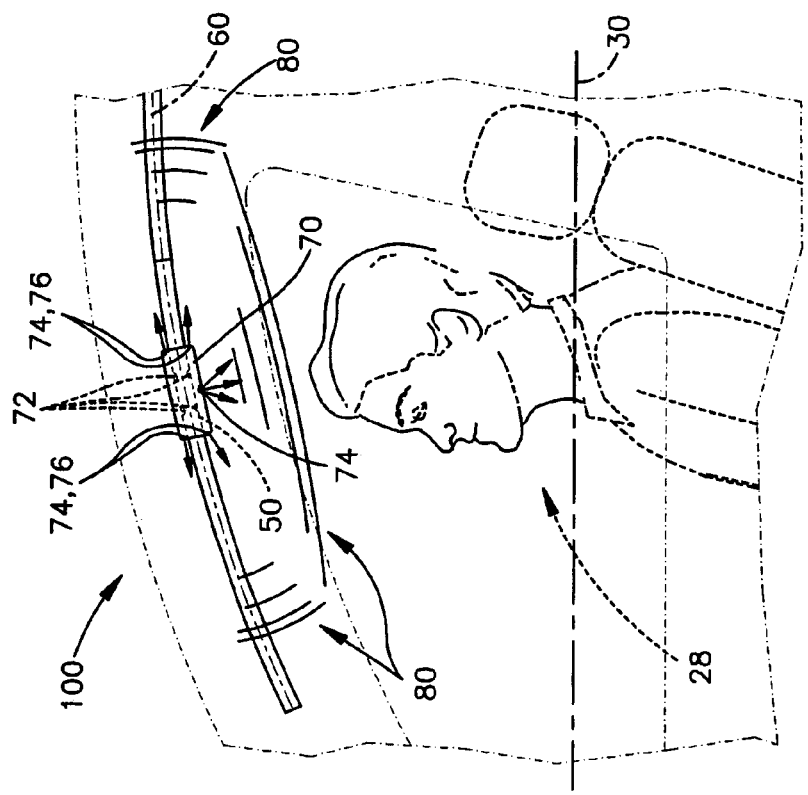
FIGS. 4A and 4B are schematic illustrations that exemplify certain performance characteristics of the apparatus of FIG. 1.
Figure 4A:
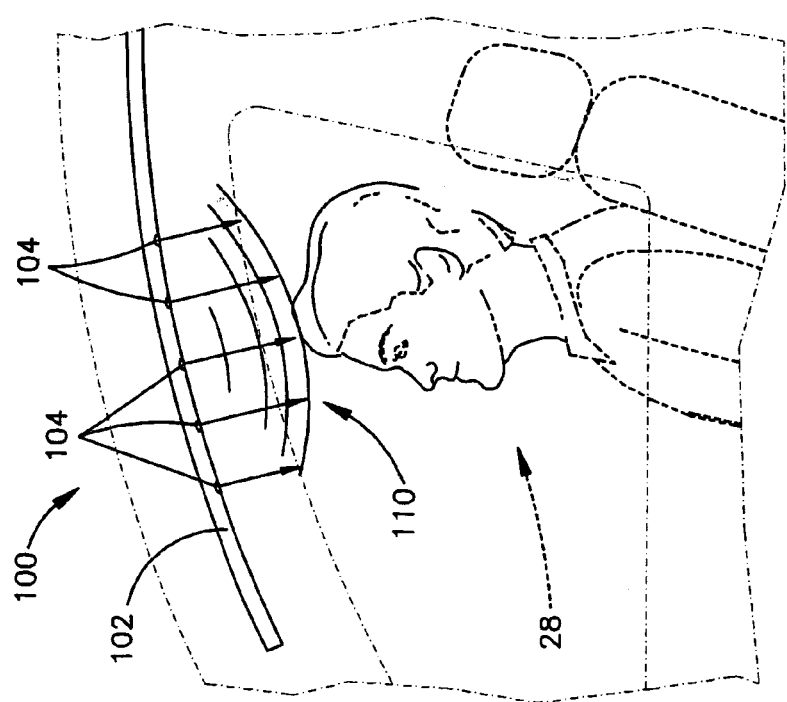

FIGS. 4A and 4B illustrate the manner in which the deflector 50 helps attenuate the pressure wave associated with deployment of the inflatable curtain 14. In FIGS. 4A and 4B, the inflatable curtain has been removed for clarity. FIG. 4A illustrates a system 100 that does not include the deflectors of the present invention. As shown in FIG. 4A, the fill tube 102 includes apertures 104 for directing inflation fluid directly into the inflatable curtain. The lines identified generally at 110 are indicative of the leading pressure wave generated during deployment of the curtain. As shown in FIG. 4A, the apertures 104 of this conventional system 100 produce a high-magnitude pressure wave 110 focused or concentrated in the general direction of the occupant 28. In this conventional configuration, the pressure wave is concentrated in one area of the curtain adjacent to the occupant 28.

FIG. 4B illustrates a system 100 including the deflector 50 of FIGS. 1-3. Referring to FIG. 4B, the lines identified generally at 80 are indicative of the leading pressure wave associated with deployment of the curtain. The deflector 50 of the present invention is configured to help reduce the magnitude of the pressure wave 80 experienced by the occupant 28. As shown in FIG. 4B, the end wall apertures 76 of the deflector 50 direct the inflation fluid in directions away from the occupant 28 and generally opposite each other. The opposing directions may also be oriented longitudinally in the vehicle 12 and may, for example, be generally parallel to the axis 60 of the fill tube 22 or the axis 30 of the vehicle 12. This results in dispersion of the inflation fluid away from the occupant 28, which helps reduce the magnitude of the initial or leading pressure wave experienced by the occupant. Thus, in the configuration of FIG. 4B, the pressure wave associated with deployment of the inflatable curtain 14 has a magnitude reduced significantly from that illustrated in FIG. 4A.

Computational fluid dynamics (CFD) modeling was performed to evaluate the performance of the configurations of FIGS. 4A and 4B. The CFD modeling confirmed that the magnitude of the leading pressure wave associated with curtain deployment is larger if the fill tube apertures are directed in the same general direction, as shown in FIG. 4A. The CFD modeling also confirmed that the magnitude of this leading pressure wave can be reduced if the apertures are arranged and configured to direct the inflation fluid in different directions. The CFD modeling also confirmed that arranging and configuring the apertures to direct the inflation fluid in opposing directions away from the occupant (e.g., through the end wall apertures 76 as shown in FIG. 4B) is very effective in reducing the magnitude of the leading pressure wave. The CFD modeling further confirmed that the degree to which the magnitude of the leading pressure wave is reduced improves as the directions in which the apertures direct inflation fluid into the curtain approach being opposite or at 180 degrees relative to each other.

From the above, it will be appreciated that the deflector 50 is arranged and configured to reduce the magnitude of the leading pressure wave acting on the curtain 14 upon inflation of the curtain. This is achieved by configuring the apertures 74 to direct inflation fluid flow in directions that help reduce the magnitude of the leading pressure wave experienced by the occupant 28. As described above, these directions are opposed to one another and ideally may be oriented longitudinally in the vehicle 12 and generally opposite or 180 degrees relative to each other. Practical considerations, however, such as the architecture of the vehicle 12 and the required package size of the apparatus 10, may limit the extent to which the apertures 74 may be configured to direct inflation fluid exactly longitudinally in the vehicle 12 (i.e., parallel to the axis 30), in exactly opposite directions (i.e., 180 degrees relative to each other), or both.

Thus, according to the present invention, the apertures 74 are configured to direct inflation fluid in generally opposing directions that are substantially opposite and substantially longitudinal in the vehicle 12. By "substantially opposite," it is meant that the apertures 74 are configured to direct inflation fluid in opposite directions to the extent permitted for a particular vehicle 12. By "substantially longitudinally in the vehicle," it is meant that the apertures 74 are configured to direct inflation fluid along the longitudinal axis 30 of the vehicle 12 to the extent permitted for the particular vehicle in which the apparatus 10 is installed. Thus, "substantially longitudinally in the vehicle," when used herein, is meant to describe or encompass configurations in which the apertures 74 are configured to direct inflation fluid in opposing directions less than 180 degrees relative to each other, not exactly parallel to the vehicle axis 30, or both.

Figure 6:
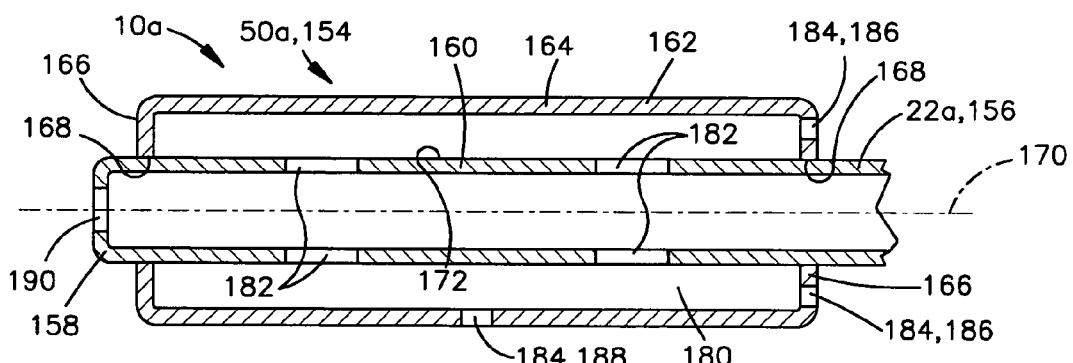
FIGS. 6 and 7 are sectional views of certain portions of the apparatus of FIG. 5.
Figure 7:
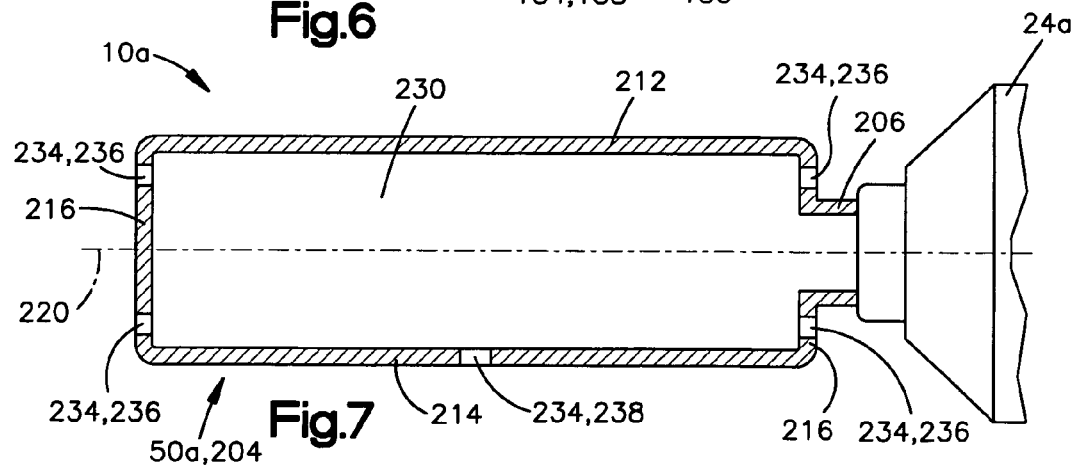
Figure 5:
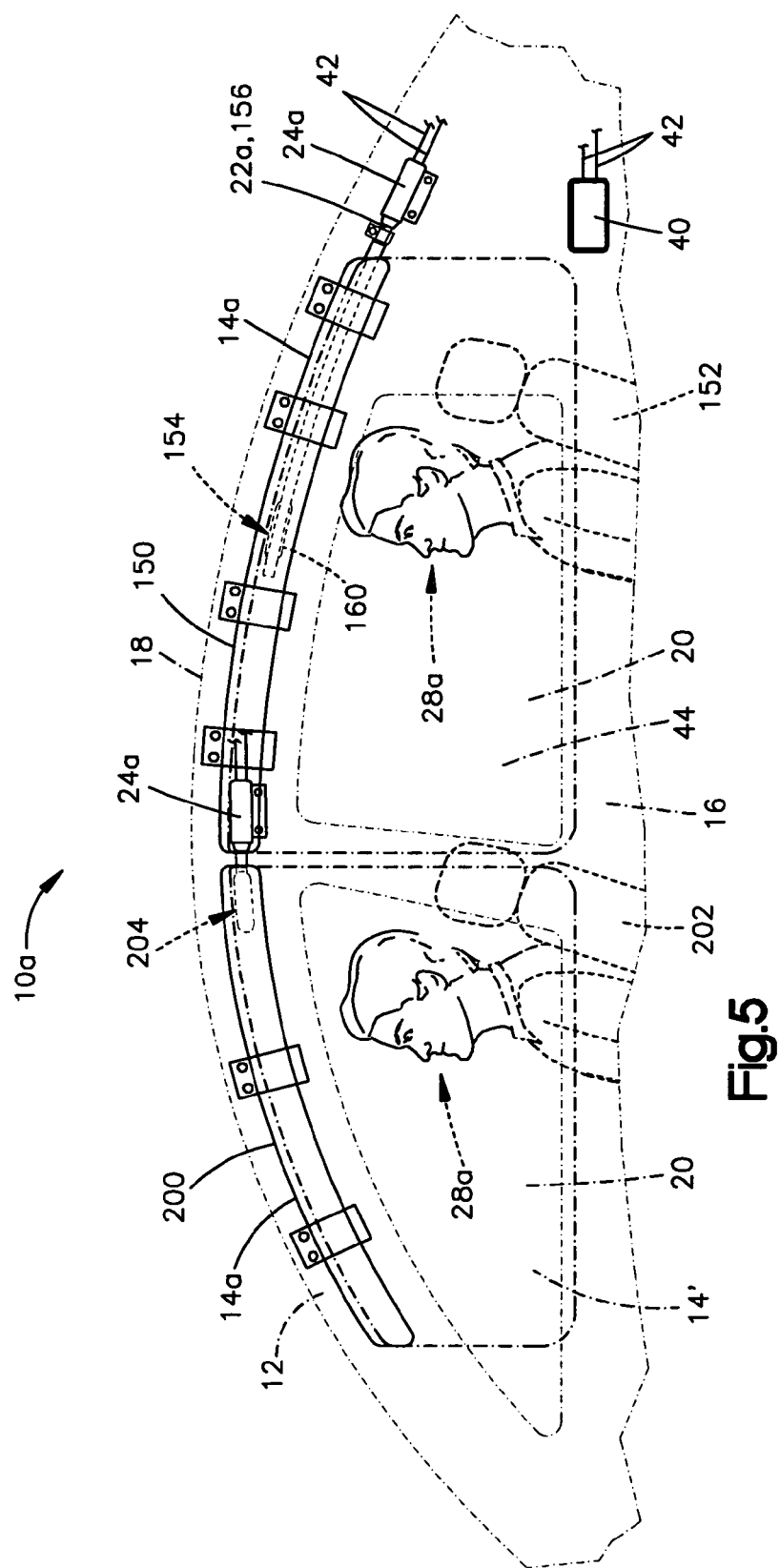
FIG. 5 illustrates an apparatus for helping to protect an occupant of a vehicle, according to a second embodiment of the present invention.

A second embodiment of the present invention is illustrated in FIGS. 5-7. The second embodiment of the invention is similar to the first embodiment of the invention illustrated in FIGS. 1-4B. Accordingly, numerals similar to those of FIGS. 1-4B will be utilized in FIGS. 5-7 to identify similar components, the suffix letter "a" being associated with the numerals of FIGS. 5-7 to avoid confusion.

Referring to FIG. 5, the apparatus 10*a* includes separate inflatable curtains 14*a*. A rear curtain 150 is associated with a passenger 28*a* of rear vehicle seating 152. A front curtain 200 is associated with a passenger 28*a* of front vehicle seating 202. Separate inflators 24*a* provide inflation fluid for inflating the front and rear curtains 200 and 150. The front and rear inflatable curtains 200 and 150 and their respective inflators 24*a* are associated with respective deflectors 50*a*, identified at 204 and 154, respectively.

The apparatus 10*a* of the second embodiment may include one or more shortened fill tubes 22*a* for directing inflation fluid into the inflatable curtains 14*a*. One such shortened fill tube configuration is illustrated by way of example with the rear curtain 150 of FIGS. 5 and 6. As shown in FIG. 5, a shortened fill tube 156 delivers inflation fluid to the rear curtain 150. In this configuration, inflation fluid is delivered to the rear curtain 150 through a terminal end portion 160 of the fill tube 156 positioned in the rear curtain 150.

Referring to FIG. 6, the deflector 154 is secured to the terminal end portion 160 of the fill tube 156. The deflector 154 may have a configuration and material construction similar or identical to those of the deflector 50 of FIG. 2. The deflector 154 includes a shroud 162 that is secured to the fill tube 156 and that encloses a portion of the fill tube. The shroud 162 has a generally cylindrical configuration with a side wall 164 generally centered on and extending generally parallel to an axis 170 of the fill tube 156. The shroud 162 also includes opposite end walls 166 with respective central openings 168 that have diameters equal or about equal to the outside diameter of the fill tube 156.

The shroud 162 is fitted over an outer surface 172 of the terminal end portion 160 of the fill tube 156 and slid or otherwise moved to a desired axial position along the tube. The shroud 162 is secured to the fill tube 156 at the desired axial position by means, such as welds, that interconnect the end walls 166 to the fill tube at the interface between the surfaces of the fill tube that define the openings 168 and the outer surface 172 of the tube.

The shroud 162 helps define an annular chamber 180 between the shroud and the fill tube 156. The fill tube 156 includes apertures 182 that provide fluid communication between the tube and the chamber 180. In the configuration of FIG. 6, there are two sets of radially opposed apertures 182. The fill tube 156 could, however, include any desired number of apertures 182 arranged in any desired configuration on the fill tube.

The shroud 162 also includes apertures 184 that provide fluid communication between the chamber 180 and the exterior of the deflector 154. The apertures 184 include end wall apertures 186 in the end wall 166 of the shroud 162 opposite the terminal end of the fill tube 156. The apertures 184 also include side wall apertures 188 in the side wall 164 of the shroud 162. In the configuration of FIG. 6, there are two end wall apertures 186 and one side wall aperture 188. It will be appreciated, however, that the shroud 162 may include any desired number of end wall apertures 186 and side wall apertures 188.

In the configuration of FIG. 6, a terminal end 158 of the fill tube 156 extends through and protrudes from one of the end walls 166 of the shroud 162. As shown in FIG. 6, the end wall 164 of the shroud 162 from which the terminal end 158 protrudes does not include any end wall apertures. Instead, the terminal end 158 of the fill tube 156 is open, defining an aperture 190 through which inflation fluid may be discharged into the rear curtain 150. It will be appreciated, however, that the fill tube 156 and deflector 154 may have a configuration (not shown) similar to that of the configuration of FIG. 1, in which the end of the fill tube is closed and the adjacent end wall of the shroud includes end wall apertures.

Referring to FIGS. 5 and 6, when inflation fluid is directed into the deflector 154 from the fill tube 156, the apertures 184 and 190 direct the fluid into the rear inflatable curtain 150. The end wall apertures 186 and fill tube aperture 190 direct inflation fluid in opposing directions which, in FIGS. 5 and 6, are substantially opposite, parallel to the axis 170, and generally away from the occupant 28*a* of the rear seating 152. As described above in regard to the first embodiment, this helps reduce the magnitude of the leading pressure wave.

The apparatus 10*a* of the second embodiment may also omit the use of fill tubes 22*a* for directing inflation fluid into the inflatable curtains 14*a*. One such configuration in which a fill tube is omitted is illustrated by way of example with the inflator 24*a* and deflector 204 associated with the front curtain 200. This is shown in FIGS. 5 and 7. As best shown in FIG. 7, the deflector 204 is connected directly to the inflator 24*a* and thus forms the only conduit for delivering inflation fluid to the front curtain 200 from the inflator.

As shown in FIG. 7, the deflector 204 has a connecting portion 206 that is adapted for connection with the inflator 24*a*. This connection may be achieved in any suitable manner, such as via a coupling, screw threads, a clamp, or a weld. The connecting portion 206 may be formed as a single piece with the deflector 204 or may be formed as a separate piece such as a flexible hose or other fitting connectable with the deflector.

The deflector 204 has a configuration and material construction similar or identical to those of the deflector 50 of FIG. 2. The deflector 204 includes a shroud 212 that has a generally cylindrical configuration with a side wall 214 centered on and extending parallel to an axis 220. The shroud 212 also includes opposite end walls 216. The connecting portion 206 extends axially from the end wall 216 proximate the inflator 24*a*.

The side wall 214 defines a chamber 230 of the deflector 204. The shroud 212 includes apertures 234 that provide fluid communication between the chamber 230 and the exterior of the deflector 204. The apertures 234 include end wall apertures 236 that extend through the end walls 216. The apertures 234 also include side wall apertures 238 that extend through the side wall 114 of the shroud 112. In the configuration of FIG. 7, there are two end wall apertures 236 in each end wall 216 and one side wall aperture 138 in the side wall 214. It will be appreciated, however, that the shroud 212 may include any desired number of end wall apertures 236 and side wall apertures 238.

Referring to FIGS. 5 and 7, when inflation fluid is directed into the deflector 204 from the inflator 24a, the apertures 234 direct the fluid into the front inflatable curtain 200. The end wall apertures 236 direct inflation fluid in opposing directions that are substantially opposite, parallel to the axis 220. As described above in regard to the first embodiment, this helps reduce the magnitude of the leading pressure wave.

In the embodiments of FIGS. 1-7, the deflectors have generally cylindrical configurations. The deflectors could, however, have alternative configurations. As described above, one consideration in reducing the magnitude of the leading pressure wave is the degree to which the opposing directions in which the inflation fluid is directed are opposite each other. Examples of alternative deflector configurations that address this consideration are illustrated by the embodiments of FIGS. 8A-8C.

Referring to FIG. 8A, an end portion 342 of a fill tube 340 is configured to form the deflector 344. An expansion chamber 354 may thus be created by expanding the end portion 340 of the fill tube 340. As shown in FIG. 8A, apertures 350 are formed in a side wall 352 of the fill tube 340. In this embodiment, the apertures 350 may be formed, for example, by piercing. The side wall 352 of the fill tube 340 is deformed to form the expansion chamber 354 having a diameter enlarged from the remainder of the fill tube 340. The apertures 350 penetrate at an angle α through the deformed side wall 356 of the expansion chamber 354. A terminal end 360 of the fill tube 340 is left open, thus forming an aperture 362. As shown in FIG. 8A, the diameter of the terminal end 360 may be reduced by means, such as swaging, thereby to reduce the diameter of the aperture 362.

Inside the fill tube 340, inflation fluid is directed to the left along a longitudinal axis 364 of the fill tube as viewed in FIG. 8A. As indicated by the arrows in FIG. 8A, inflation fluid is directed through the apertures 350 and 362 and in opposing directions that may be generally opposite each other. This helps reduce the magnitude of the leading pressure wave.

In FIG. 8B, a deflector 380 is similar to the deflector 154 of FIG. 6. In FIG. 8B, the deflector 380 has a generally rounded configuration as opposed to the generally cylindrical configuration of FIG. 6. In FIG. 8B, the deflector 380 includes a shroud 382 that is secured to a fill tube 384 by known means, such as welding. An annular chamber 390 is defined between the shroud 382 and the fill tube 384. Apertures 392 penetrate at angle β through the shroud 382. A terminal end 400 of the fill tube 384 is left open, thus forming an aperture 402. As shown in FIG. 8B, the diameter of the terminal end 400 may be reduced by means, such as swaging, thereby to reduce the diameter of the aperture 402.

Inside the fill tube 384, inflation fluid is directed to the left along a longitudinal axis 404 of the fill tube 384 as viewed in FIG. 8B. As indicated by the arrows in FIG. 8B, inflation fluid is directed through the apertures 392 and 402 in opposing directions that may be generally opposite each other. This helps reduce the magnitude of the leading pressure wave.

In FIG. 8C, deflectors 420 are similar to the deflector 380 of FIG. 8B. In FIG. 8C, the deflectors 420 are spaced along the length of a fill tube 422. The deflector 420 indicated at 424 is similar to the deflector of FIG. 8B, except that the deflector 424 includes apertures 430 penetrating at angle an γ through the shroud 432 for directing inflation fluid in opposing directions, which may be generally opposite each other, along a longitudinal axis 434 of the fill tube 422. It will be appreciated that the deflector 424 is suited for placement at any desired location along the length of the fill tube 422.

The deflector 420 indicated at 426 is adapted for placement at a terminal end 436 of the fill tube 422. The deflector 426 thus covers the open terminal end 436 of the fill tube 422. The deflector 426 includes apertures 440 for directing inflation fluid in opposing directions. Two apertures 440 are oriented for directing inflation fluid in radial directions relative to the axis 434. One aperture 440 is axially aligned with the open terminal end 436 of the fill tube 422.

Inside the fill tube 422, inflation fluid is directed to the left along the axis 434 as viewed in FIG. 8C. As indicated by the arrows in FIG. 8C, inflation fluid is directed from the deflector 424 through the apertures 430 in opposing directions that may be generally opposite each other. Inflation fluid is directed from the deflector 426 through the apertures 440 in opposing directions that may be generally opposite each other. This helps reduce the magnitude of the leading pressure wave.

From the above description of the invention, those skilled in the art will perceive applications, improvements, changes and modifications to the present invention. Such applications, improvements, changes and modifications within the skill of the art are intended to be covered by the appended claims.

Having described the invention, we claim the following:

1. An apparatus for providing inflation fluid to an inflatable vehicle occupant protection device, said apparatus comprising:
   an inflator actuatable to provide inflation fluid for inflating the protection device;
   a conduit for directing inflation fluid into the protection device from said inflator; and
   a deflector arranged in fluid communication with said conduit and having at least a portion in fluid communication with the protection device, said deflector being configured to direct inflation fluid into the protection device in opposing directions to reduce the magnitude of pressure waves experienced by a vehicle occupant.

2. The apparatus recited in claim 1, wherein said opposing directions are substantially opposite each other.

3. The apparatus recited in claim 1, wherein said opposing directions are generally opposite each other.

4. The apparatus recited in claim 1, wherein said opposing directions extend generally longitudinally in the vehicle.

5. The apparatus recited in claim 1, wherein said opposing directions are substantially parallel to a primary flow direction in said conduit.

6. The apparatus recited in claim 1, wherein said deflector comprises a shroud secured to said conduit and encircling a portion of said conduit, an annular chamber being defined between said conduit and said shroud, said conduit comprising apertures for directing inflation fluid into said chamber, said shroud comprising apertures for directing inflation fluid in said opposing directions.

7. The apparatus recited in claim 6, wherein said apertures of said conduit direct inflation fluid into said chamber in a direction substantially perpendicular to an axis of said conduit, said apertures of said shroud directing inflation fluid in said opposing directions substantially parallel to said axis of said conduit.

8. The apparatus recited in claim 6, wherein said shroud has a generally tubular configuration with opposite end walls through which at least a portion of said apertures extend.

9. The apparatus recited in claim 6, wherein said shroud includes end portions to facilitate a connection with said conduit.

10. The apparatus recited in claim 6, wherein said conduit has an open end portion for directing inflation fluid into said protection device.

11. The apparatus recited in claim 1, wherein said conduit comprises a fill tube.

12. The apparatus recited in claim 1, wherein said deflector comprises:
   a portion of said conduit in which a side wall of said conduit is deformed to form an expansion chamber having a diameter enlarged from the remainder of the conduit; and
   apertures that extend through a wall of said expansion chamber, said apertures directing inflation fluid to flow in opposing directions into the protection device.

13. An apparatus for helping to protect an occupant of a vehicle, said apparatus comprising:
   an inflatable curtain inflatable between the side structure and a vehicle occupant;
   an inflator for providing inflation fluid for inflating said inflatable curtain;
   a fill tube for delivering inflation fluid from said inflator to said inflatable curtain, said fill tube having a longitudinal axis; and
   a deflector secured to said fill tube, said deflector comprising apertures for directing inflation fluid from said fill tube into said inflatable curtain in opposing directions substantially along said longitudinal axis.

14. The apparatus recited in claim 13, wherein said opposing directions are substantially opposite each other.

15. The apparatus recited in claim 13, wherein said deflector comprises a shroud secured to said fill tube and encircling a portion of said fill tube, an annular chamber being defined between said fill tube and said shroud, said fill tube comprising apertures for directing inflation fluid into said chamber, said shroud comprising apertures for directing inflation fluid from said chamber into said inflatable curtain.

16. The apparatus recited in claim 15, wherein said apertures of said fill tube direct inflation fluid into said chamber in a direction substantially perpendicular to said longitudinal axis of said fill tube, said apertures of said shroud directing inflation fluid in said opposing directions substantially parallel to said longitudinal axis of said fill tube.

* * * * *